United States Patent

Koivunen

[15] 3,665,707
[45] May 30, 1972

[54] VEHICULAR TRANSMISSION PUMP DRIVES

[72] Inventor: Erkki A. Koivunen, Livonia, Mich.

[73] Assignee: General Motors Corporation, Detroit, Mich.

[22] Filed: Mar. 8, 1971

[21] Appl. No.: 122,041

[52] U.S. Cl. ........................................... 60/54, 74/730
[51] Int. Cl. .................................. F16d 31/06, F16d 33/00
[58] Field of Search .............................. 60/54; 74/730

[56] References Cited

UNITED STATES PATENTS 2,013,126 9/1935 Bonn ................................. 60/54 UX
2,858,675 11/1958 Schneider ........................... 60/54 UX
3,321,056 5/1967 Winchell et al. ..................... 192/85 R

*Primary Examiner*—Edgar W. Geoghegan
*Attorney*—W. E. Finken, A. M. Heiter and R. L. Phillips

[57] ABSTRACT

The pump in an automatic transmission is drivingly connected by one-way clutches to be driven by either the transmission converter's impeller or turbine, whichever is turning faster. The drive connection between the pump and the converter's turbine is provided by a drive member which extends through the converter's flow circuit and around the converter's stator in the converter's eye to connect to the turbine.

4 Claims, 2 Drawing Figures

Patented May 30, 1972

3,665,707

INVENTOR.
Erkki A. Koivunen
BY
Ronald L. Phillips
ATTORNEY

VEHICULAR TRANSMISSION PUMP DRIVES

This invention relates to vehicular transmissions and more particularly to vehicular transmission pump drives.

In vehicular transmissions having an engine driven hydrodynamic torque converter which in turn powers range gearing, it is conventional practice to have a single hydraulic pump in the transmission continuously driven by the engine via the transmission input for supplying hydraulic pressure to the transmission's converter and control system. It is also conventional practice to have an additional pump which is driven from the vehicle's driving wheels so that pressure is available when the engine is not running and the vehicle is in motion. In copending United States patent application Ser. No. 838,549, filed July 2, 1969, now U.S. Pat. No. 3,554,056, issued Jan. 12, 1971, by Edward N. Cole, entitled "Vehicle Transmission Pump Drives" and assigned to the assignee of this invention, there is disclosed a single hydraulic pump which is driven by the transmission input when the input is powering the transmission and driven by the transmission output when the output is powering the transmission. Such a single pump system is especially advantageous in a central hydraulic system where the single pressure source serves, in addition to the transmission, other hydraulically operated vehicle equipment. The present invention readily enables incorporation of this general type of pump drive arrangement in a commercial type transmission with a minimum number of drive parts of simple construction and without requiring relocation of the pump and while maintaining the transmission's lengthwise dimension to a minimum.

The present invention is illustrated in a vehicular transmission which includes a hydrodynamic torque converter comprising a rotary housing that houses an impeller member that rotates therewith, a turbine member and a reaction member that is located intermediate the turbine and impeller members with these members cooperatively providing a closed loop flow circuit. A hydraulic pump which serves as a hydraulic pressure source for the transmission's converter and control system and also for other hydraulically operated vehicle equipment is located adjacent to the converter next to the impeller member and is centered on the transmission's axis. The pump input member extends through an opening in one end of the converter's rotary housing and is provided with a first pump drive that includes a one-way clutch that operates to normally drivingly connect the pump input member to rotate with the impeller member and thus with the rotatable converter housing and engine. A second pump drive includes another one-way clutch and also a drive transmitting member which extends through the converter's flow circuit intermediate the reaction member and the impeller and crosses over the reaction member in the converter's eye to connect with the turbine member. The last-mentioned one-way clutch operates to drivingly connect the pump input member to rotate with the turbine member whenever the turbine member is rotating faster than the impeller member which would be the case when there is reverse power flow from the vehicle's driving wheels back to the transmission, instead of the normal power flow from the engine through the transmission to the vehicle's driving wheels. All of the pump drives including both of the one-way clutches are located within the converter housing with the one-way clutches axially aligned with the pump input member and sharing a race member to provide a simple pump drive arrangement of minimum lengthwise dimension.

An object of the present invention is to provide a new and improved vehicular transmission pump drive arrangement.

Another object is to provide in a vehicle transmission a hydraulic pump which by a pump drive arrangement within a hydrodynamic torque converter is driven through a one-way clutch by the converter's impeller and may also be driven through a one-way clutch by the converter's turbine.

Another object is to provide in a vehicular transmission having a hydrodynamic torque converter a hydraulic pump which is normally driven by the converter's impeller through a one-way clutch located within the converter's rotary housing and which is alternatively driven by the converter's turbine through a one-way drive that is also located within the converter housing and includes a drive transmitting member which extends through the converter's flow circuit between the converter's reaction member and impeller member and passes around the reaction member through the eye of the converter for connection to the turbine.

These and other objects of the present invention will be more apparent from the following description and drawing in which.

Figure 1:
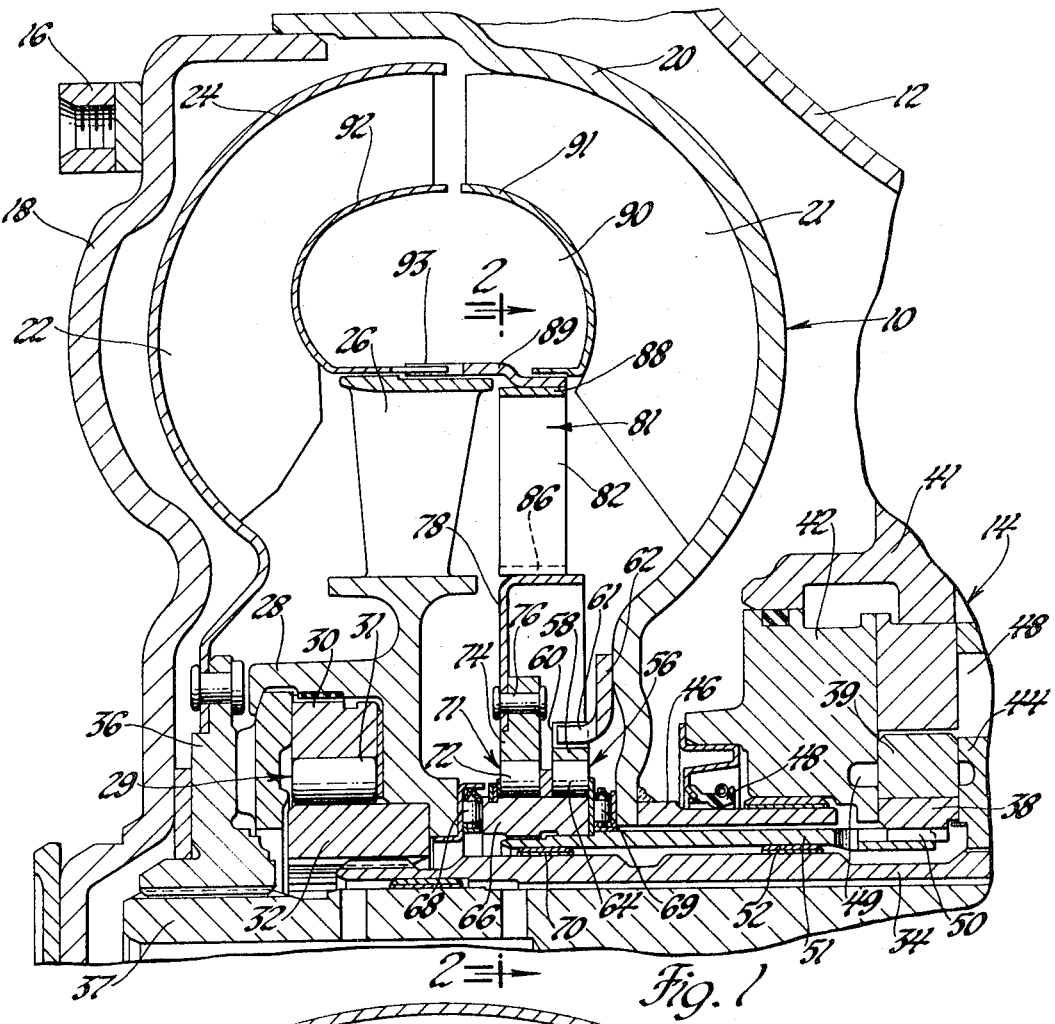
FIG. 1 is a partial longitudinal sectional view of a vehicular transmission having a pump drive arrangement constructed according to the present invention.

Referring to the drawing, FIG. 1 illustrates the invention for use in a vehicular transmission of the type disclosed in U. S. Pat. No. 3,321,056 issued to Winchell et al. and entitled "Transmission and Control System," such a transmission arrangement generally comprising a three element hydrodynamic torque converter 10 and range gearing, not shown, housed within a transmission housing 12. The converter and range gearing arrangement is operable to provide several forward speed range drives and a reverse drive with the pressure source from such operation provided by a hydraulic pump 14. For a more detailed understanding of the operation of the overall transmission arrangement, reference may be made to the aforementioned Winchell et al. patent. According to the present invention, the hydraulic pump 14 is connected to be driven by either the converter's input or output, whichever is rotating faster, and by one-way clutch drives that are totally contained within the torque converter 10.

Describing first the structure of the torque converter 10, input from the vehicle's engine to the converter 10 and thus to the transmission is provided by bolting the engine's crankshaft at circumferentially spaced lugs 16 to the converter's front cover 18. Front cover 18 is welded to a rear cover 20 whereby the welded covers provide a rotary converter housing. The rear cover 20 also serves to carry a plurality of vanes or blades 21 providing the converter's pump or impeller member. The impeller member 21 on fluid supply thereto and rotation thereof pumps fluid to a plurality of vanes or blades 22 that are carried by a shell 24 and provide the converter's turbine member. A plurality of vanes or blades 26 located between the exit of the turbine member 22 and the entrance of the impeller member 21 are carried by a hub 28 and provide the converter's stator or reaction member. A one-way brake 29 which provides for preventing reverse rotation of the reaction member 26 while permitting free forward rotation thereof, comprises an outer cam member 30 which is splined to the hub 28 and engages a plurality of circumferentially arranged rollers 31. Rollers 31 also engage cylindrical race 32 which is splined to a stationary sleeve 34, the sleeve 34 extending through an opening in the rear end of the converter and being made stationary by affixing to the transmission housing 12 as described in more detail later. The rollers 31 operate between the cam member 30 and inner race 32 to permit free rotation of the reaction member 26 in the same direction as the impeller member 21 and thus the engine output which direction will be called the forward direction and to prevent reverse rotation of the reaction member. The converter structure thus far described is of conventional design and provides torque multiplication up to the converter's coupling point and fluid coupling operation thereafter. Input to the transmission's range gearing is provided by riveting the turbine member to a hub 36 that is in turn splined to the front end of a shaft 37. The shaft 37 extends through sleeve 34 to deliver the converter or turbine output to the transmission's range gearing to propel the vehicle. For a more detailed discussion of the operation of the transmission including the range gearing, reference may be made to the aforementioned Winchell et al. patent.

According to the present invention, the single hydraulic pump 14 provides the hydraulic pressure source for operating the transmission including supplying the torque converter 10 and the control system and this pressure source may also be used to supply the vehicle's other hydraulically operated equipment which may include a power steering system. The hydraulic pump 14 is arranged between torque converter 10 and the transmission's range gearing and is axially aligned therewith. The hydraulic pump 14 is of the vane type comprising a rotor 38 carrying vanes 39. The rotor 38 with its vanes 39 are housed in a front bulkhead 41 located between or intermediate the converter 10 and the transmission's rearwardly mounted range gearing. Sandwiching the rotor 38 and vanes 39 to complete the pump housing are front and rear cover plates 42 and 44, these plates being fixed to the front and rear sides of the bulkhead 41. The sleeve 34 from the one-way brake 29 is splined at its rear end to the rear plate 44 and is thus made stationary to provide reaction for the converter operation. The front plate 42 provides a bearing support for the rotary converter housing by supporting a sleeve or hub 46 that is welded to the open rear end of the rear converter cover 20 at its inner radius, there being provided an oil seal 48 between the front plate 42 and sleeve 46 to prevent leakage outward of the converter housing. The pump 14 has intake porting 48 for receiving hydraulic fluid from the transmission's sump on its intake side and with the rotor 38 supplied with torque, it turns to drive the vanes 39 to provide pumping action to deliver hydraulic fluid at pressure to porting 49 for delivery to operate the transmission and other hydraulically operated vehicular equipment. The pump's rotor 38 is supplied with torque by being connected by a tongue and slot connection 50 to a sleeve shaft 51 that is located intermediate the converter hub 46 and stationary sleeve 34 and is supported for rotation on the latter shaft by a sleeve bearing 52 where sleeve 34 extends through the front cover plate 42 of the pump housing.

Figure 2:
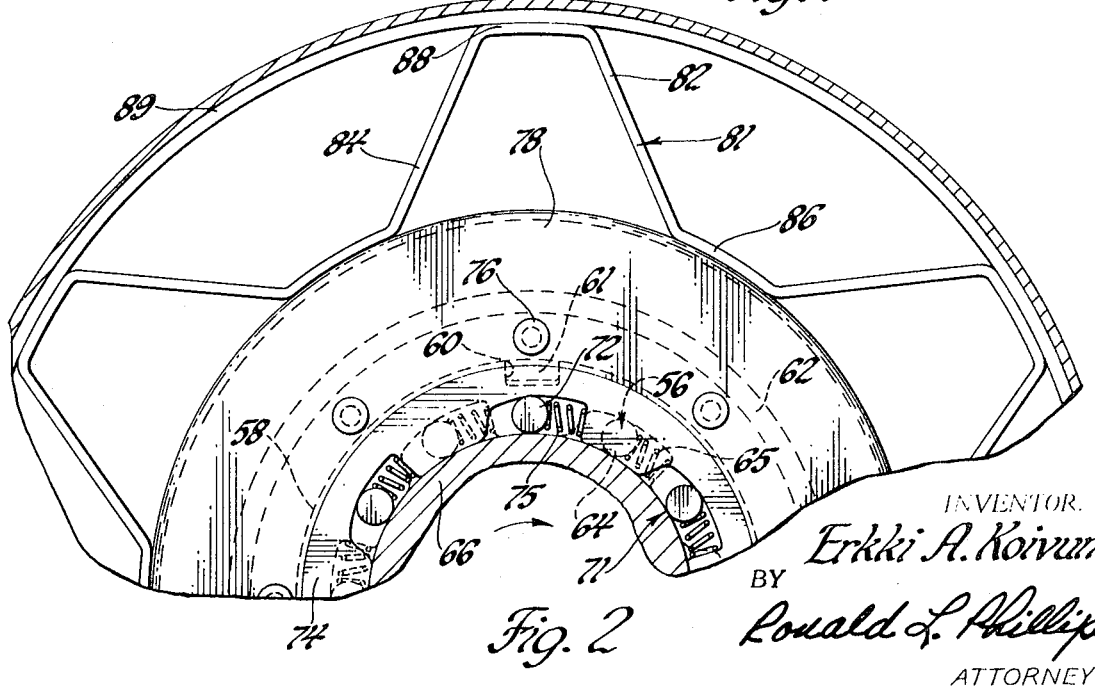
FIG. 2 is a view taken on the line 2—2 of FIG. 1.

Two pump drives are provided for driving the hydraulic pump's input or drive shaft 51. One of these pump drives provides a one-way drive from the engine via the converter's rotary converter housing and impeller member and the other provides a one-way drive from the transmission's output via the converter's turbine member. The one-way pump drive from the transmission input comprises a one-way clutch 56 that is located within the rotary converter housing and is axially arranged between the reaction hub 28 and the center portion of rear cover 20 of the impeller member 21. The one-way clutch 56 is of the roller type and comprises an outer cam member 58 which has notches 60 in its periphery that receive axially directed portions 61 of lugs 62 that are welded to the rear cover 20 so that the outer clutch member 58 rotates with the impeller and converter housing and thus with the engine. The outer cam ring 58 has a plurality of internal cam surfaces which are engaged by rollers 64 that are urged to this engagement by small biasing forces provided by tickler springs 65. Rollers 64 also engage the outer surface of a cylindrical race member 66. The race member 66 is located intermediate the hub 28 of the reaction member 26 and the hub of the rear converter cover 20 by two needle thrust bearing assemblies 68 and 69. Race member 66 is splined at its interior to the forward end of the pump drive shaft 51 that extends into the converter housing for this purpose and is supported at this attaching point by a sleeve bearing 70 that is located intermediate shaft 51 and sleeve 34. As shown in FIG. 2, the cam surfaces of the cam member 58 are inclined so that the one-way clutch 56 operates to prevent rotation of the cam member 58 relative to the inner race 66 in the direction indicated by the arrow which direction is the forward direction and permits reverse rotation relative thereto thereby providing a one-way drive from the converter's impeller member 21 to the pump drive shaft 51 which will permit the pump drive shaft to overrun the impeller member when the turbine member is rotating faster than the pump as described in more detail later.

The one-way pump drive from the converter's turbine member 22 to the pump 14 comprises a one-way roller type clutch 71 that is also located within the converter's housing and intermediate the one-way clutch 56 and the hub 28 of the reaction member 26. The one-way clutch 71 comprises a plurality of rollers 72 that engage the outer surface of cylindrical race member 66 of the one-way clutch 56 which race member is thus common to both of the one-way clutches of the pump drive arrangement. The rollers 72 are urged to engage the internal cam surfaces of an outer cam member 74 by tickler springs 75. The cam surfaces of the cam member 74 are inclined in the same direction as those of cam member 58 of the one-way clutch 56. The cam member 74 is connected by rivets 76 to an annular flange 78 that extends radially outward intermediate the exit of the reaction member 26 and the entrance of the impeller member 21 to a point radially inward of the converter's flow circuit. Drive is transmitted through the converter's flow circuit by a drive strut 81 which as shown in FIG. 2, is provided by a circumferentially waved thin strip 82 wherein the waves of the strip trace a generally trapezoidal form with the sides 84 being that part of the strut which actually extends through the converter's flow circuit. The sides 84 lie in planes parallel to the axis of the converter to minimize restriction to flow of the converter's hydraulic fluid. The drive strut 81 is welded at its inner radius portions 86 to flange 78 and is welded at its outer radius portions 88 to a ring shaped member 89. Member 89 extends into the hollow center or eye 90 of the converter that is defined by core members 91 and 92 of the impeller member 21 and turbine member 22, respectively. The ring shaped member 89 extends around the reaction member 26 and has a tongue and slot connection 93 in the converter's eye 90 with an axial extension of the turbine's core member 92 and thus with the turbine member 22. Thus, the one-way clutch 71 is connected to provide a one-way drive from the turbine member 22 to the pump drive shaft 51 and also to permit the pump drive shaft to overrun the turbine member when the impeller member overruns the turbine member.

With this pump drive arrangement, the hydraulic pump 14 is normally driven through the one-way clutch 56 by its one-way clutch operation causing the pump's drive shaft 51 to rotate with the converter's impeller member 21 recognizing that the vehicle's engine is normally powering the transmission and that the turbine member 22 will then always be rotating at a speed less than the impeller member 21. Since the impeller member 21 is overrunning the turbine member 22, the other one-way clutch 71 is released and overruns.

Alternatively, when the vehicle is in motion but the vehicle engine is not powering the transmission and with a transmission drive engaged, power is delivered from the vehicle's driving wheels to the converter's turbine member 22. Thus, the converter's turbine member 22 will turn forwardly relative to the impeller member 21 and at that time the one-way clutch 71 will engage to provide drive to the hydraulic pump with the one-way clutch 56 then releasing and overrunning.

Thus, the hydraulic pump 14 is driven by the converter impeller member when the input is powering the transmission and is driven by the converter turbine when the output is powering the transmission. By having only one hydraulic pump with a drive from both the transmission input and the transmission output, the advantages of a two pump arrangement are gained with considerable cost savings, particularly those resulting from maintaining the pump in the conventional location. Furthermore, the converter turbine backup drive made available by the drive strut 81 and the one-way clutch 71 located intermediate the impeller and reaction sections of the converter and the normal operating pump drive made available by the other one-way clutch 56 positioned in this same axial location do not increase the lengthwise dimension of the converter and thus the transmission. In addition, both of the one-way clutches 56 and 71 are in a position to be readily lubricated by fluid from the converter's circuit. Furthermore, there is the simplicity of the turbine backup drive which is particularly characterized by the drive strut 81 which is simply made of strip material and the sharing of the one race member by both of the one-way clutches.

The above described embodiment is illustrative of the invention which may be modified within the scope of the appended claims.

I claim:

1. A transmission including a hydrodynamic torque converter comprising an impeller member, a turbine member and a reaction member located intermediate the turbine and impeller members with all of said members cooperating to provide a flow circuit for torque converter operation, a hydraulic pump having an input, first pump drive means having first one-way clutch means for normally drivingly connecting said pump input to rotate with said impeller member, and second pump drive means including second one-way clutch means and further including drive transmitting means extending through said flow circuit intermediate said reaction member and said impeller member for drivingly connecting said pump input to rotate with said turbine member.

2. A transmission including a hydrodynamic torque converter comprising an impeller member, a turbine member and a reaction member located intermediate said turbine and impeller members with all of said members cooperating to provide a flow circuit for torque converter operation, a hydraulic pump having an input axially aligned with said hydrodynamic torque converter, first pump drive means including first one-way clutch means located in said hydrodynamic torque converter for normally drivingly connecting said pump input to rotate with said impeller member, second pump drive means located in said hydrodynamic torque converter, said second pump drive means including second one-way clutch means and also including drive transmitting means extending through said flow circuit for drivingly connecting said pump input to rotate with said turbine member, and said drive transmitting means including drive strut means that extends through said flow circuit intermediate said reaction member and said impeller member and is connected around said reaction member to said turbine member.

3. A transmission including a hydrodynamic torque converter comprising a rotary housing having an opening in one end, an impeller member connected to rotate with said rotatable housing, a turbine member having a hub, a turbine shaft connected to rotate with said turbine member and extending through said opening outwardly of said converter housing, a reaction member located intermediate said turbine and impeller members and having a hub located intermediate the hub of said turbine member and said one end of said converter housing, a hydraulic pump axially aligned with the axis of said converter housing and said converter members and having an input member extending through said opening into said converter housing, first pump drive means including first one-way clutch means located within said converter housing for normally drivingly connecting said pump input member to rotate with said impeller member, second pump drive means located within said converter housing, said second pump drive means comprising second one-way clutch means located intermediate the hub of said reaction member and said first one-way clutch means, said second pump drive means further comprising drive transmitting means extending through said flow circuit intermediate said reaction member and said impeller member for drivingly connecting said pump input member to rotate with said turbine member by operation of said second one-way clutch means, said first and second one-way clutch means having a common clutch member located between the hub of said reaction member and said one end of said converter housing, and said first and second one-way clutch means each having a cam member whose cam surfaces are inclined so that said first one-way clutch means operates to drivingly connect said pump input member to rotate with said impeller member when said impeller member is rotating faster than said turbine member and said second one-way clutch means operates to drivingly connect said pump input member to rotate with said turbine member when said turbine member is rotating faster than said impeller member.

4. A transmission including a hydrodynamic torque converter comprising a rotary converter housing having an opening in one end, an impeller member connected to rotate with said converter housing, a turbine member, a turbine shaft connected to rotate with said turbine member, a reaction member located intermediate said turbine and impeller members, said impeller member and said turbine member and said reaction member cooperating to provide a closed loop flow circuit, a hydraulic pump external to said converter housing and having an input member axially aligned with said converter member and extending through said opening into said converter housing, a first one-way clutch located within said converter housing and having a driving member connected to rotate with said impeller member and a driven member connected to rotate with said pump input member, one of said clutch members having cam surfaces, clutching means arranged intermediate said cam surfaces and the other clutch member to provide for clutching said pump input member to rotate with said turbine member, a second one-way clutch located within said converter housing and having a driving member and also having a driven member connected to rotate with said pump input member, one of said members of said second clutch having cam surfaces, clutching means for cooperating with said cam surfaces and the other member of said second clutch means to clutch said driving member of said second clutch means to rotate with said driving member of said second clutch means whenever the driving member of said second clutch means is rotating faster than the driving member of said first clutch means, and drive transmitting means for connecting the driving member of said second clutch means to rotate with said turbine member, said drive transmitting means including strut means whose longest dimension at least substantially parallels the axis of said converter housing with said strut means extending through said converter flow circuit intermediate said reaction member and said impeller member, said drive transmitting means further comprising means for connecting said strut means inside the loop of said flow circuit to said turbine member.

* * * * *